United States Patent Office 3,213,593
Patented Oct. 26, 1965

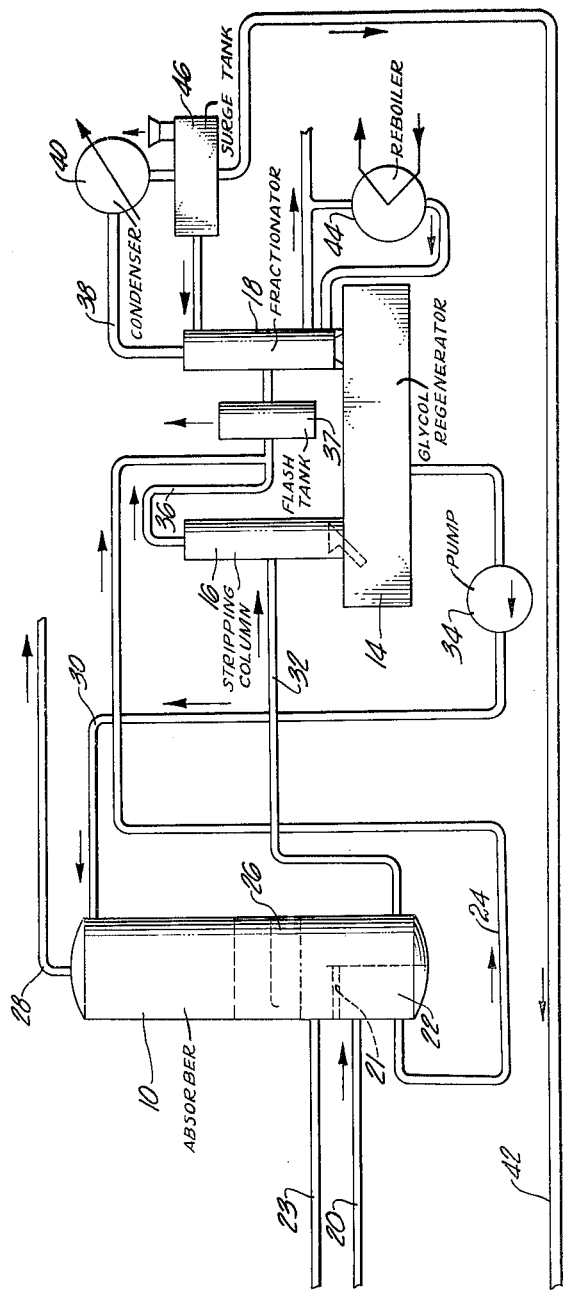

3,213,593
REDUCTION OF HYDRATE FORMATION IN
GAS PRODUCTION EQUIPMENT
Lloyd T. Hendrix, Santa Ana, Calif., assignor to Richfield
Oil Corporation, Los Angeles, Calif., a corporation of
Delaware
Filed July 8, 1963, Ser. No. 293,482
6 Claims. (Cl. 55—32)

The present invention is a continuation-in-part of Serial No. 184,470 filed March 30, 1962, and now abandoned and relates to a method for reducing hydrate formation in gas handling and processing equipment and, more particularly, relates to a method for recovering a volatile freezing point depressant from effluents from such gas equipment into which the depressant has been injected to reduce hydrate formation therein.

Gas hydrates are formed in gas equipment such as well tubing and casing, through which moisture laden gas passes, due to the existence of favorable hydration conditions as the moisture condenses out of the gas and is intimately mixed with some of the lighter gases, for example, methane, ethane and propane. These gas hydrates are formed as waxy or granular solid substances and may have some of the following constituents: methane hydrate, $CH_4.7H_2O$; ethane hydrate, $C_2H_6.8H_2O$, propane hydrate, $C_3H_8.18H_2O$. The specific requirements for hydrate formation at a given pressure are (1) temperature at or below hydrate formation temperature, (2) presence of water in a liquid state and (3) means for thorough agitation of the water and gas.

The formation of natural gas hydrates in well casings and tubing and associated apparatus has been very troublesome in the production of natural gas. Quite often the hydrate problem is primarily in the tubing string with the problem area extending to depths of several hundred feet. Also, undesirable hydrates form in gas refrigeration and other processing equipment.

Previous attempts to reduce hydrate formation in downhole production equipment have been to heat the well tubing in the problem area with various downhole heating techniques as, for example, by circulating hot oil through the annulus around the tubing. The use of heating means to prevent gas hydrates, however, necessarily involves a relatively large expenditure for heating. Another prior art proposal involves the use of downhole glycol injection. Glycol injection, however, can be applied only to wells with little or no bottom hole water and very little connate water, otherwise the glycol regeneration unit is logged down. In addition to the lack of flexibility relative to produced water, the glycol injection system for hydrate prevention has the disadvantage of introducing salts, sand and dirt contaminants into the glycol regenerator. Glycol injection systems are also plagued with an emulsion effect which is cumulative in the glycol since nearly all wells deliver a mineralized water and/or condensate. Thus, over a relatively short period of time the glycol, because of its high viscosity, does not separate well from the condensate, which results in fouling of the contactor and glycol regenerator. Due to the high viscosity and density of glycol, it cannot be gas lifted as readily as water, oil or gas. Since the glycols have a strong adhesion and coat the casing string and tubing string, a very large inventory of glycol is built up downhole.

It has also been proposed to inject methanol to prevent hydrate formation; however, since methanol has such a relatively high vapor pressure and its loss as vapor is very high, its use has been restricted to emergency situations. The prior art suggests methods for separating the methanol from water recovered as liquid; however, methanol is lost mainly as vapor and the prior art does not suggest any system by which methanol lost to the vapor phase can be recovered.

Accordingly, it is a primary object of my present invention to provide a method for reducing hydrate formation in gas handling and processing equipment whereby a volatile freezing point depressant used therein may be economically recovered.

It is a further object of my present invention to provide an economical method for reducing hydrate formation in gas well equipment by the injection of methanol whereby methanol may be recovered from the gas phase as well as from liquids recovered from well effluents.

It is also an object of my present invention to provide a method for recovering methanol injected into gas wells to reduce hydrate formation whereby the vaporized methanol is recovered from the gas by absorption and subsequently recovered from the rich absorbent.

Other objects and a more complete understanding of my present invention will become apparent by reference to the appended claims and the following specification taken in conjunction with the drawing in which a flow diagram is shown which illustrates one embodiment of my present invention utilizing a modified absorption system for dehydrating moisture laden natural gas and also recovering methanol in said system.

Briefly stated, the embodiment of my present invention described herein relates to a process for reducing hydrate formation in gas wells by injecting methanol downhole into the well and subsequently recovering both the methanol dissolved in the liquids recovered from the moisture laden produced gas and the vaporized methanol. By passing the well effluent (containing vaporized methanol and water) into a glycol absorption unit, methanol is removed with water vapors from the natural gas and may be subsequently stripped from the rich absorbent in a conventional glycol regenerator. The overhead vapors (containing water and methanol) from the glycol regenerator stripping column together with the liquid methanol solution recovered from the well effluent prior to absorption, are then fed to a methanol fractionator where methanol is separated as an overhead product from water, condensed and returned to the well for reinjection.

With reference to the drawing, a gas dehydration system is shown as adapted for the recovery of methanol from a well effluent according to my present invention. This equipment involves generally the use of a glycol absorbent contactor unit 10 and a glycol regenerator 14 which includes a stripping column 16 for reducing the water content of the rich absorbent solution to an appropriate level for reuse in the absorber 10. The water and methanol vapors are released from the absorbent in stripping column 16 and are then united with an aqueous methanol solution recovered from the gas before absorption, and fed into a methanol fractionator 18 which may, for convenience, be skid mounted on the regenerator vessel 14. Methanol is recovered overhead from the fractionator 18, and condensed preparatory to reinjection.

Incoming wet natural gas which may contain methanol and water in either the condensed or vapor phases or both, is charged into the glycol absorber tower 10 through line 20, where the gas is first stripped of any condensed liquids in a scrubbing section 22, preferably having a scrubbing element 21 of the wire mesh type, within the absorber tower 10 or in a scrubber which is a unit separate from the absorber tower 10. An aqueous methanol solution is removed from the well effluent in the scrubbing section and pumped through line 24 into the methanol-water separator. The liquid methanol solution removed in the scrubber section comprises water and methanol condensed from the effluent prior to entering the scrubber section 22, and any bottom hole or connate water which the well effluent has carried from the well. Condensed hydrocarbons recovered in the scrubber are sent to the crude line through pipe 23.

After the gas has been passed through the inlet scrubber 22 for removal of free liquids and particulate matter, the gas (containing water and methanol vapors) is subjected to the action of a glycol absorbent in a conventional absorber tower 10 which absorbs water and methanol from the natural gas. The absorber tower may be of the type disclosed in my copending application, Serial No. 78,019 for "Absorption Process and Apparatus" filed December 23, 1960. The scrubbed gas preferably passes into the glycol contacting section 26 where the gas passes into contact with the absorbent to absorb water and methanol vapors from the natural gas. Treated natural gas is discharged from the tank through overhead pipe 28.

The expressions "wet" or "rich" glycol refer to a water solution of diethylene glycol or triethylene glycol wherein the water content of the glycol solution exceeds the water content of the "lean" glycol pumped into the absorber tower through line 30 to absorb moisture from moisture laden natural gas fed into the unit. Generally, "wet" glycol discharged from the absorber tower 10 for regenerating, contains about 10% water and 90% glycol whereas "lean" glycol which is fed back into the absorber tower through pipe 30, contains 2–4% water and 98–96% glycol. In the glycol regenerating process the water content of the glycol solution is reduced from about 10% water to about 2% water. Although the apparatus and process described herein relates primarily to the regeneration of tri- and diethylene glycol, the principles involved are also applicable to the regeneration of other liquid absorbents such as amine, glycol, or potassium carbonate solution which is used for sweetening and/or dehydrating natural gas.

The wet glycol containing methanol solution is passed through pipe 32 into the glycol regenerator 14 which may be any type of glycol regeneration equipment, preferably the apparatus disclosed in my aforementioned copending application. The glycol regeneration equipment effects the separation of methanol and water from the glycol solution. The regenerated or lean glycol is pumped back into the contactor tower 10 through line 30 with a pump 34. The separated water and methanol vapors are drawn off as vapors from the fractionator 16 which may be a simple packed type unit designed to return vaporized glycol into the regenerator vessel 14 to prevent the loss of glycol overhead with the water and methanol vapors discharged from the glycol regeneration equipment.

Water and methanol vapors recovered from the wet glycol are recovered overhead from the fractionation still 16 and are charged into a methanol fractionator 18 through pipe 36. The methanol fractionation unit 18 may be of the conventional fractionating type and preferably will have heat supplied thereto through a reboiler 44. Methanol reflux from the condenser unit 40 may be supplied to the fractionator 18 through a vented surge tank 46. Methanol is recovered overhead in fractionator 18 through pipe 38, condensed in a condenser 40 and returned to the well for injection or sent to storage through line 42. The methanol solution recovered as liquid in the scrubber section 22 of absorber 11 is passed through line 24 and united with the water and methanol vapors recovered overhead from the still 16 and charged together therewith into the water-methanol fractionator 18. A flash tank (packed column) 37 may be positioned just ahead of the methanol fractionator 18 to remove hydrocarbons and provide contact between the overhead vapor stream 36 and the liquid stream 24 prior to and during the separation of hydrocarbon gas from the liquid stream or feed to the fractionating column 18. Removal of the hydrocarbon gas in a flash tank 37 eliminates the need for condensation of the hydrocarbons in condenser 40. My process thus provides a method for recovering methanol from the well effluent from both the liquid and vapor phases.

During operation of the process of my present invention for recovering methanol from effluents from systems into which methanol has been injected to reduce the formation of hydrates, the effluent is first treated to physically remove liquids as, for example, in scrubber section 22, after which the water and methanol vapors are removed from the natural gas by contacting said effluent with an absorbent in a conventional absorption tower, such as the glycol absorption tower 10. The dehydrated gas passes overhead from the absorbent tower to pipeline facilities. Methanol is recovered with the moisture by absorption with the glycol in the contactor. The rich glycol containing the absorbed water and methanol is passed into a regenerating unit 14 which serves the dual purpose of regenerating the glycol after which it can be pumped back into the contactor tower 10 and used again for removing water and methanol from undehydrated well effluent, and separating the methanol from the glycol so that it can be readily separated in a simple fractionation unit 18 from the water with which it is released from the glycol. Thus, the glycol absorber system including the glycol regenerator is utilized as a means for recovering vaporized methanol from well effluents. The methanol which is recovered overhead from the fractionator 18 is condensed preparatory to reinjection into the system in which the formation of hydrates is to be reduced.

Although my method for recovering methanol has been described in conjunction with the reduction of hydrate formation in gas wells, it is to be understood that the scope of my invention is not to be so limited since the underlying principles involved may be utilized to recover methanol from any hydrocarbon aqueous solution and from methanol which has been used to reduce hydrate formation in any system, for example, gas transmission lines and equipment, etc. Also, my invention may be used in refrigeration systems as a method for recovering freezing point depressants used to reduce hydrate formation.

As an example of my present invention, a well producing 10,000,000 s.c.f. per day at 1000 p.s.i. with approximately 50 barrels per day of produced water requires 27 barrels per day of injected methanol at a separation temperature of 22° F., to prevent hydrate formation at ground temperatures of down to about −6° F. (with a hydrate formation temperature of 65° F.). The well effluent at 22° F. contained about 3.0 gallons per mm. s.c.f. The methanol loss overhead from the absorber unit was 0.2 gallon per mm. s.c.f. The fractionator had a 2:1 reflux ratio based on the overhead product.

Although I have described my present invention with a certain degree of particularity, it is to be understood that the present disclosure has been made only by way of example and that numerous changes in the details of the process and the apparatus may be made without departing from the spirit of the invention hereinafter claimed.

I claim:

1. In a method for recovering a volatile freezing point depressant from a substantially gaseous effluent from equipment having surfaces contacted by said effluent and into which said depressant has been injected to reduce hydrate formation, said effluent containing water in vapor form and previously injected depressant in vapor form, the steps comprising:

contacting said effluent with an absorbent in an absorption contactor vessel, absorbing and recovering in said absorbent during said contacting water vapors and depressant vapors from said effluent, subsequently liberating said absorbed and recovered water vapors and depressant vapors from said absorbent, and subsequently subjecting said liberated water vapors and depressant vapors to fractionation to recover said depressant.

2. In a method for recovering alcohol from a substantially gaseous effluent from a well into which alcohol has been injected to reduce hydrate formation, said effluent containing natural gas with water and previously injected alcohol in vapor form, the steps comprising:

contacting said effluent with an absorbent in an absorption contactor vessel, absorbing and recovering in said absorbent during said contacting water vapors and alcohol vapors from said effluent, subsequently liberating said absorbed water and alcohol vapors from said absorbent, and subsequently subjecting said liberated water vapors and alcohol vapors to fractionation to recover said alcohol.

3. In a method for recovering alcohol from a substantially gaseous effluent from a well into which alcohol has been injected to reduce hydrate formation, said effluent containing natural gas with water and previously injected alcohol in vapor and liquid form, the steps comprising:

separating said liquids from said effluent, contacting said effluent with an absorbent in an absorption contactor vessel, absorbing and recovering in said absorbent during said contacting water vapors and alcohol vapors from said effluent, subsequently liberating said absorbed water and alcohol vapors from said absorbent, and subsequently subjecting said liberated water vapors and alcohol vapors together with said liquids originally recovered from said well effluent to fractionation to recover alcohol therefrom.

4. In a method for recovering alcohol from a substantially gaseous effluent from a well into which alcohol has been injected to reduce hydrate formation, said effluent containing natural gas with water and previously injected alcohol in vapor and liquid form, the steps comprising:

separating said liquids from said effluent, contacting said effluent with an absorbent in an absorption contactor vessel, absorbing and recovering in said absorbent during said contacting water vapors and alcohol vapors from said effluent, passing said absorbent containing said absorbed water and alcohol vapors into a stripping vessel and subsequently liberating said absorbed water and alcohol vapors from said absorbent, and subsequently subjecting said liberated water vapors and alcohol vapors together with said liquids originally separated from said well effluent to fractionation to recover alcohol therefrom.

5. In a method for recovering methanol from a substantially gaseous effluent from a well into which methanol has been injected to reduce hydrate formation, said effluent containing primarily natural gas with water and previously injected methanol in vapor and liquid form, the steps comprising:

separating liquid water and methanol from said effluent, contacting said effluent with an absorbent in an absorption contactor vessel, absorbing and recovering in said absorbent during said contacting water vapors and methanol vapors from said effluent, subsequently liberating said absorbed methanol and water vapors from the rich absorbent and thereby regenerating said absorbent for recirculation into said contactor vessel, recirculating said regenerated absorbent to said contactor vessel, and subsequently fractionating said liberated water and methanol vapors together with the liquids separated from said effluent to recover substantially pure methanol.

6. A method for preventing hydrate formation in a natural gas well, comprising the steps of:

injecting methanol into said well, recovering the effluent from said well, said effluent containing liquids, water in vapor form, and previously injected methanol in vapor form, separating said liquids produced in said well from the natural gas and vapors in said well effluent, contacting said effluent with an absorbent in an absorption contactor vessel to absorb said water vapor and methanol vapor, absorbing and recovering in said absorbent during said contacting water vapors and methanol vapors from said effluent, subsequently liberating said absorbed and recovered water vapors and methanol vapors from said absorbent, separating methanol by distillation from said absorbed water and methanol vapors and said liquids originally separated from said well effluent, condensing said methanol recovered overhead from said distillation, and returning said recovered methanol to said well for injection therein.

References Cited by the Examiner

UNITED STATES PATENTS

| | | | |
|---|---|---|---|
| 1,676,735 | 7/28 | Keyes | 202—42 |
| 2,364,660 | 12/44 | Reid | 55—80 X |
| 2,388,048 | 10/45 | Garrison et al. | 55—56 X |
| 2,423,156 | 7/47 | Reid | 55—80 X |
| 2,437,288 | 3/48 | Anderson | 55—32 |
| 2,603,311 | 7/52 | Frazier et al. | 55—32 |
| 2,668,137 | 2/54 | Baird et al. | 55—56 X |
| 2,690,814 | 10/54 | Reid | 55—48 |
| 2,782,141 | 2/57 | King | 55—56 X |
| 2,855,433 | 10/58 | Cobb | 55—56 X |
| 3,069,829 | 12/62 | Worley | 55—32 |
| 3,096,383 | 7/63 | Hann | 260—676 |

FOREIGN PATENTS 1,133,497  7/62  Germany.

OTHER REFERENCES

Hammerschmidt, E. G.: "Gas Hydrates," The American Gas Association Monthly, Mid-Summer 1936, pp. 273–276.

Woolfolk, Jr., R. M.: "Methanol as a Hydrate Inhibitor," The Oil and Gas Journal, April 21, 1952, pp. 124, 159, 160.

REUBEN FRIEDMAN, *Primary Examiner*.